April 23, 1940.  J. I. LINER  2,198,055
FLOAT-OPERATED LIQUID LEVEL GAUGE
Filed Feb. 26, 1937  3 Sheets-Sheet 1
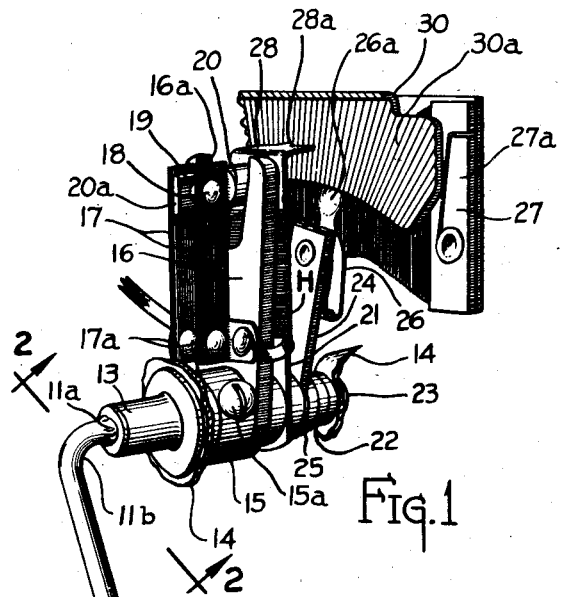
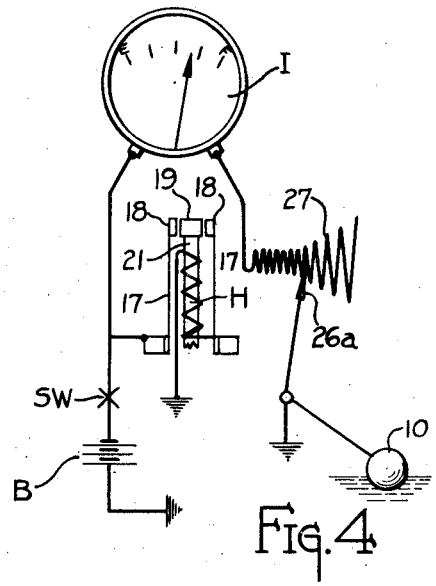
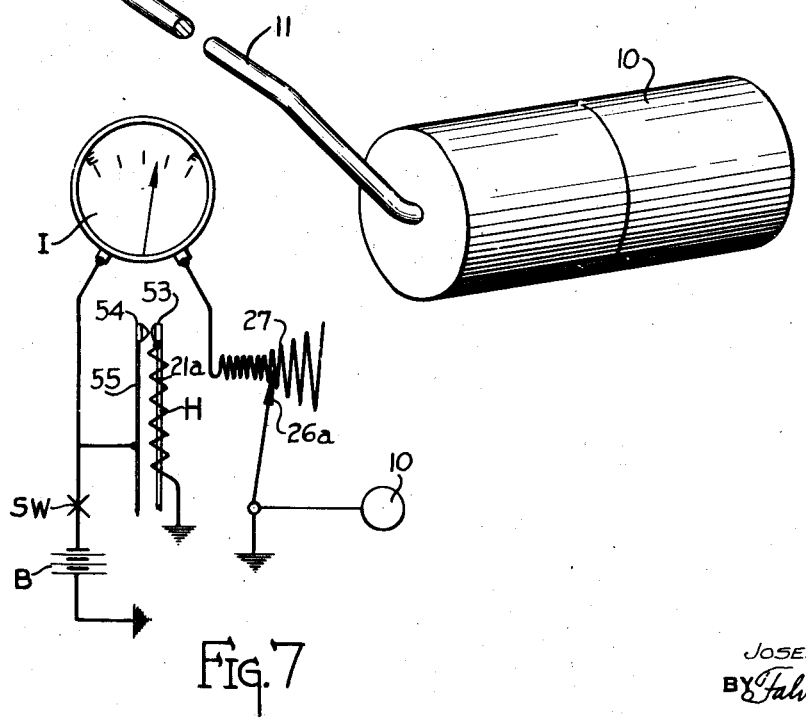
INVENTOR
JOSEPH I. LINER
BY Falvey & Stoltenberg
ATTORNEYS

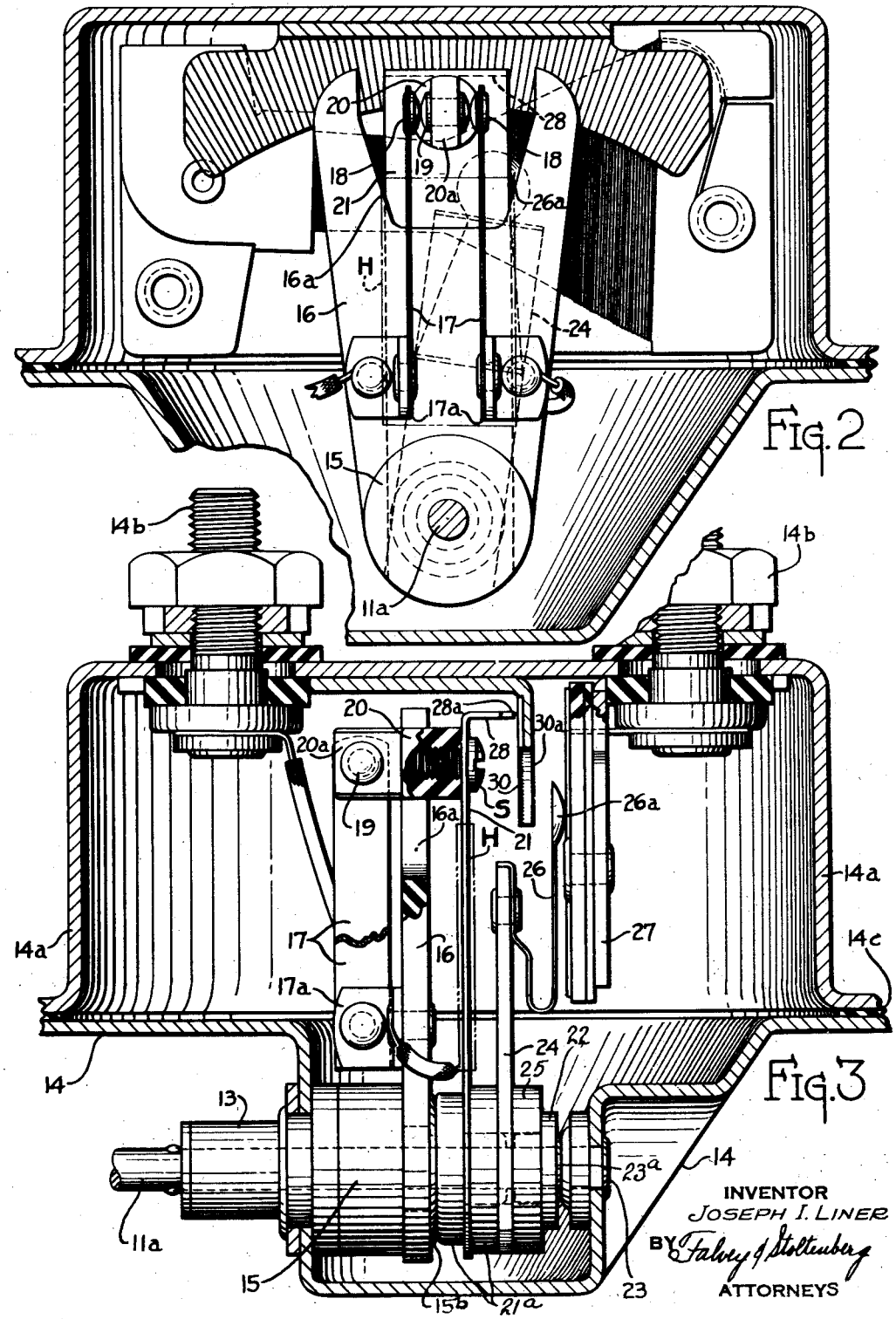

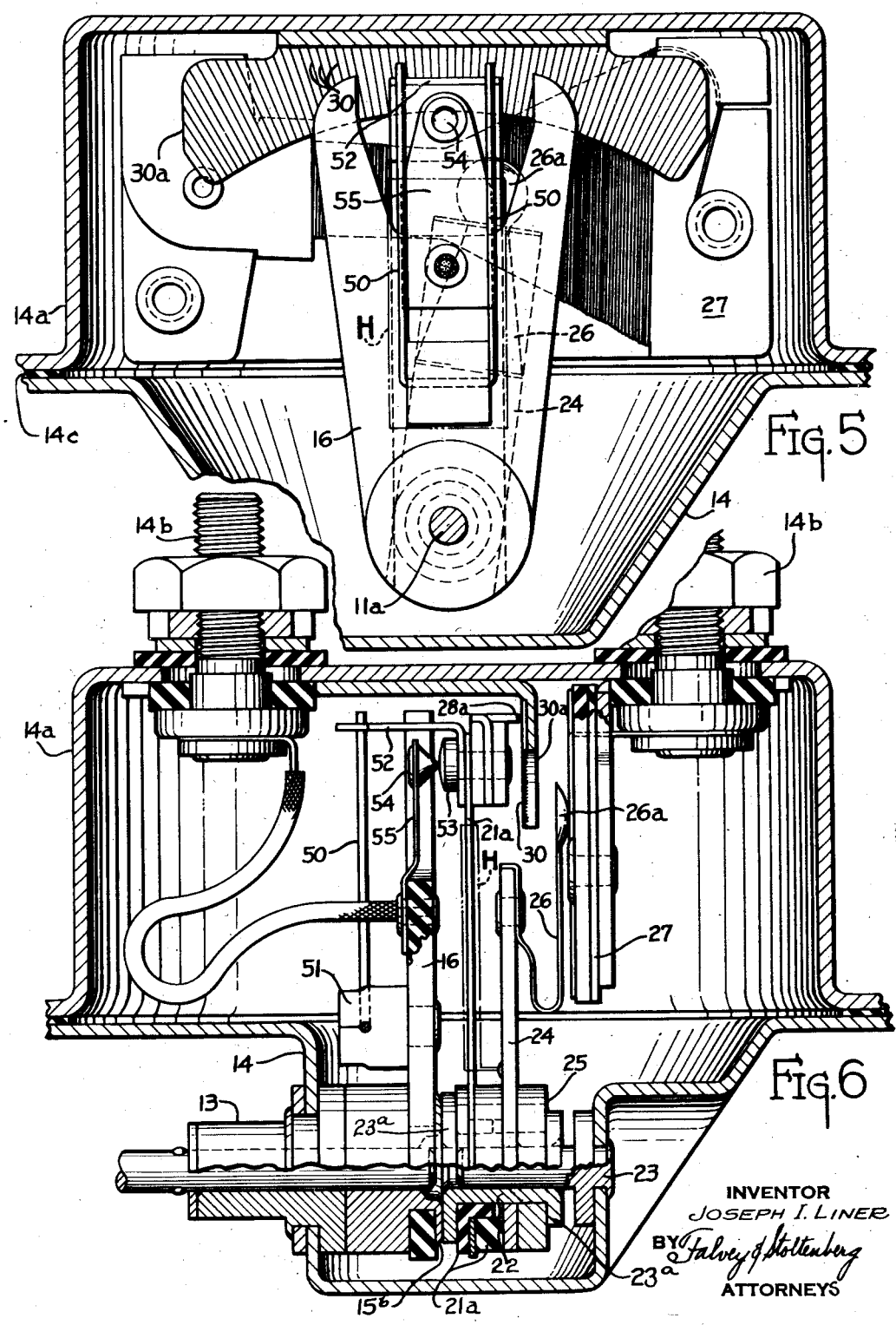

Patented Apr. 23, 1940

2,198,055

UNITED STATES PATENT OFFICE 2,198,055

FLOAT-OPERATED LIQUID LEVEL GAUGE

Joseph I. Liner, Toledo, Ohio

Application February 26, 1937, Serial No. 127,826

6 Claims. (Cl. 73—313)

This invention relates to liquid level gauges, more particularly to initiating devices actuated by a float means or the like in proportion to variations in the datum to be measured.

Indicator pointers on gauges such as, for example, float-operated rheostatic gas gauges with armatures actuated by magnetic coils, in the past have had a tendency to jiggle over the dial face so that accurate reading of the gauge was difficult, if not altogether impossible. This was particularly true of the gas gauges on the tanks of automotive vehicles. In this application of the liquid-level gauges, the gasoline level in the tank of the vehicle is subject to side variations, arising from the motion of the vehicle, from inherent vibration and other disturbing factors.

Surges of the gasoline level in the tank of the vehicle particularly caused undesirable variations in the gauge readings. These surges arise in general from the inertia of the gasoline, causing the fluid to "crowd" to one end of the tank as a result of a sudden change of direction or changes of speed on the part of the vehicle.

The inherent vibration of the vehicle during operation and the vibration due to motion give rise to the numerous ripples on the surface of the gasoline in the tank to which the float-actuator controlling the rheostatic device responds. This response to the slight variations in level sends a series of impulses to the indicating gauge (usually located on the dashboard of the vehicle) which results in a constant "hunting" of the indicator to respond to these variations. The "hunting" defeated, in part, the purpose of the gauge by causing the needle to dance in a very unsatisfactory way.

This invention contemplates the provision of a means to overcome these undesirable features of liquid level gauges as they are known in the prior art. An element providing a time delay has been utilized to attain this end. Bimetallic strips are preferably used for this purpose because their cheapness and simplicity recommend them.

Heretofore indicating instruments mounted on the dashboard have used bimetallic strips for obtaining readings with a time lag such as is disclosed in application, Serial No. 86,576, filed June 22, 1936, but the use of a time-delay means such as bimetallic strips has not been known as applied to the initiating devices adjacent the datum to be measured. This invention contemplates the provision of an initiating device to cooperate with the datum whose variations are to be indicated at a remote place, which will respond to major variations in the datum if these variations are sustained through a predetermined period of time, but will not respond to variations of short duration.

It is, therefore, an object of this invention to provide a liquid level indicating gauge which will have a steady indicating pointer and which will respond to sustained variations in the level of the datum, but will not respond to momentary variations.

It is a further object of this invention to provide a time-delay mechanism suitable for cooperating with initiating devices of a liquid level gauge.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Figure 1 is a perspective view with the supporting parts cut away.

Figure 2 is a sectional elevation taken along the line 2—2 of Figure 1.

Figure 3 is a sectional elevation taken at right angles to the axis of the axle of Figure 2.

Figure 4 is a schematic diagram of connections.

Figure 5 is a sectional elevation of a modification of the invention.

Figure 6 is a sectional elevation taken at right angles to the axis of the axle of Figure 5.

Figure 7 is a schematic diagram of connections of the modification shown in Figures 5 and 6.

Referring to the drawings, particularly to Figure 1, there is shown a perspective view of a modification of the invention which clearly shows the principal parts thereof in their cooperative relation.

A float 10 is provided which is preferably of some buoyant material such as cork or the like and is placed in cooperative relation with a datum whose changes in level are to be indicated. The float 10 is provided with an arm 11 which terminates in a stub shaft 11a which is journaled in a bushing 13. The arm 11 may be bent to any shape desired but is preferably provided with a right angle turn 11b immediately adjacent the bushing 13 and merges with the stub shaft 11a so that changes in level of the datum will cause the float 10 to rise or fall. This movement will be transmitted by the arm 11 to the stub shaft 11a in the form of angular displacement in the bushing 13. Adjacent the bushing 13, which may be supported in a housing 14 in any well known manner, a collar 15 is provided which is secured to the stub shaft 11a by means of a set screw 15a. In this way, when the float 10 moves with the changes in level of the datum, the collar 15 will be rotated in proportion to the movement of the float.

Attached to the collar 15 by a riveted flange 15b or the like, there is provided a Y-piece 16 of insulating material which rotates with the collar 15. At the upper end of the piece 16 there is provided a V-notch 16a so that the arms of the Y-piece 16 form a stop means as will be further described hereinafter. Adjacent the collar 15, two resilient members 17 are fastened to the Y-piece 16 by means of right angle clips 17a which are riveted or otherwise securely fastened to both the resilient members 17 and the Y-piece 16. In this manner, the two resilient members 17 are mounted in parallel juxtaposition at a spaced distance from themselves and from the Y-piece 16.

At the upper ends of the resilient members 17, contact points 18 are riveted in position, one contact being provided for each resilient member. The contact points are positioned in axial alignment for cooperation with a contact member 19 positioned between them, the contact member having two surfaces adapted to cooperate with the contact points. The contact member 19 is mounted on an insulating plug 20 which is provided at its terminal end with a flattened portion 20a to form a non-interfering support for the contact member 19 to hold it in position between the two resilient members 17 so that cooperation may be had, with the contact points 18. The insulating plug 20 fits into V-notch 16a of the Y-piece 16 and projects therethrough as is shown in Figure 3. The cooperation between the plug 20 and the branches of the Y-piece 16 limit the relative movement between the parts, so that the Y-piece 16 serves as a stop means.

The insulating plug 20 is mounted on a thermal element such as a strip 21 of bimetallic thermal material by means of screws as shown in Figure 3. The bimetallic element extends downwardly from this point in parallel juxtaposition with the Y-piece 16 and is provided with an insulated sleeve 22 which cooperates with a stud 23 projecting from the housing 14. The stud 23 is preferably riveted in position as shown in Figure 3. The bimetallic strip 21 is insulated from the sleeve 22 by means of the insulating rings 21a. Attached to the sleeve 22 is a metallic arm 24 which is mounted in parallel juxtaposition with the bimetallic element 21 and held in fixed relation therewith so that it will rotate with the sleeve 22 about the stud 23. Any rotative effort applied to the bimetallic element 21 by the float 10 will tend to rotate the sleeve 22 and the arm 24 in unison. A collar 25 is provided on the exterior side of the metallic arm 24 and the whole assembly, including the bimetallic strip 21 and the metallic arm 24, is held together by riveted flanges 23a on the sleeve 22.

Adjacent the upper end of the metallic arm 24, a slide 26 is provided which is fastened to the arm in any well known manner, such as riveting or the like. The slide is provided with a ball-shaped contact member 26a which is adapted to cooperate with a rheostat 27, comprising preferably resistance wire wound upon an insulating plate 27a.

The upper end of the bimetallic element 21 is bent over to provide a flanged portion 28 which is provided at its outer end with a nib 28a. The nib 28a is preferably provided with a sharp point so that it may be engaged in serrations 30 on an arcuate plate 30a. The serrations 30 are preferably cut along radial lines having the stud 23 as a center, and may be made in any convenient spaced relation. The nib 28a cooperates with the valleys of the serrations 30 at predetermined times as will be described hereinafter. The co-operative action between these portions is obtained through the bending of the bimetallic thermal element 21 to place the nib 28a into an adjacent valley between the serrations to hold the contact member 26a in fixed relation to the rheostat 27. The temperature of the bimetallic strip is controlled by means of a heating unit H, preferably in the form of resistance wire wound around the bimetallic strip 21 and insulated therefrom in any convenient manner. The interaction of the heater unit H and the other elements of the structure will be described in detail hereinafter.

The serrated arcuate plate 30a is preferably supported in cooperative relation with the nib 28a by being attached in any convenient manner such as welding or riveting to a cover 14a (Figure 3) which encloses the complete unit by cooperating with the housing 14. In a similar manner, the rheostat 27 is attached to the cover 14a to be in cooperative position with the contact member 26a. For convenience in connecting the electrical parts of the structure in circuit with extraneous apparatus, binding posts 14b are provided which may be insulated from the cover 14a in any well known manner. The cover 14a and the base portion 14 are held in cooperative relation in any convenient manner, for example, by stud screws (not shown) or the like. To prevent leakage into the interior of the enclosure, a gasket means 14c is provided at the cooperating surfaces between the cover and the housing.

The electrical circuits through the complete instrument, including an indicating means I of any convenient type, for example, one using magnetic actuating coils are shown schematically in Figure 4. A battery B or other source of energy is provided to energize the circuits and preferably has one side connected to the ground as shown. A switch SW is preferably supplied to break the battery circuit at times when the gauge is not in use, the switch for convenience may be actuated simultaneously with the ignition switch of an automotive vehicle. The circuit through the indicating means includes the battery B, the switch SW, the indicating means I, and the rheostat 27 whose slide 26a, is controlled by the float 10; the slide 26a is connected to the ground to complete the circuit through the battery. The second electrical circuit through the apparatus includes the battery B, the switch SW, the contact points 18, and the contact member 19 and the heater unit H wound around the bimetallic strip 21; the circuit is grounded from the heater unit which completes the circuit through the battery. In the schematic diagram of connections shown in Figure 4, the cooperative relation between the slide 26a on the rheostat 27 and the bimetallic strip is not indicated but will be described in detail hereinafter.

In describing the operation of the device, reference to Figures 1 to 4 is desirable. Assuming that the switch SW is open (Figure 4), which is preferably combined with the ignition switch of an automobile, all the circuits as shown are dead and no current is flowing. During this period, the bimetallic strip 21 is unflexed so as to free the nib 28a from cooperating with the serrations 30, and the contact member 19 is in contact with both of the contact points 18 mounted on the resilient strips 17. Under these circumstances, the float 10 has full control over the movements of the contact member 26a on the rheostat 27, and any variation in the level of the datum to be measured will find immediate response in the movement of the slide.

A force initiated at this time by the float 10 in responding to variations in the level of the datum, is transmitted to the arm 11 which, in turn, transmits it to the stub shaft 11a. The stub shaft 11a transmits it to the collar 15 which, in turn, moves the Y-piece 16. The Y-piece 16 moves the resilient members 17 which, in turn, transmits the force to the plug 20 through the interaction of the contact points 18 and the contact member 19. The plug 20 being attached to the bimetallic strip 21 conveys the force directly to the arm 24, thence to the contact member 26a. In this manner, there is a resilient connection formed between the stub shaft 11a and the arm 24 to which the slide 26 is fastened, the resiliency being obtained by the flexure of the resilient members 17 alternately by the contact member 19. The resilient members 17 are sufficiently stiff to enable the float 10 to control at times of open circuit the movements of the contact member 26a on the rheostat 27.

If, now, the switch SW is closed under the circumstance, for example, of an operator turning on his ignition switch in an automotive vehicle to commence operation thereof, both circuits in the liquid level gauge are energized. The circuit through the indicating means I immediately indicates the level of the datum to be measured as determined by the resistance in the circuit as controlled by the interaction of the contact member 26a and the rheostat 27. The response at this time, as pointed out above, is instantaneous to all variations in changes in level of the datum, the gauge acting during this short interval until the holding means acts as a usual gauge. In the second circuit, the current is flowing through the heater unit H by flowing through the contact points 18 and the contact member 19 to raise the temperature of the bimetallic strip 21. If the conditions at the datum are quiescent, the contactual relation between the contact points 18 and the contact member 19 will not be disturbed and the circuit through the heater unit H will be complete to give the bimetallic strip 21 ample time to flex. As the heater unit H changes the temperature of the bimetallic strip 21, a flexure will be obtained in a clockwise direction (Figure 3) to place the nib 28a into cooperative relation with the serrations 30. With the nib 28a cooperating with a valley between the serrations 30, the position of the contact member 26a is predetermined and held fixed until such times as the bimetallic strip 21 will have cooled sufficiently to cause it to return approximately to its normal position to free the nib 28a from its cooperative relation with the serrations 30.

It is clear, therefore, that as long as the circuit is maintained through the heater unit H, the temperature of the bimetallic strip will be such as to cause a flexure to hold the nib 28a into a valley of the serrations 30. Then, as long as the temperature of the bimetallic strip is maintained at this degree, the float 10 does not have the power to move the contact member 26a and the indicating means I will show a steady reading. The float 10, however, may still oscillate with the changes in level of the datum because the resilient strips 17 form a flexible connection between the stub shaft 11a and the arm 24 to which the contact member 26a is attached.

The oscillations of the float 10 have a tendency to break the circuit through the heater unit H inasmuch as the resilient members 17, carrying the contact points 18, will by their independent flexure by the plug 20, free either of the contact points 18 from its contactual relation with the contact member 19. This action will break the circuit through the heater unit since the contact points and the contact member are connected in series as is clearly shown in Figure 4. When the circuit through the heater unit H is broken, it immediately begins cooling and relaxes in a counterclockwise direction (Figure 3) to free the nib 28a from a valley of the serrations 30 to allow the float 10 to again control the contact member 26a. This cooling of the bimetallic strip 21 requires a definite interval of time, depending upon the relation of the capacity of the heater unit H and the radiating surfaces on the bimetallic strip. By varying these relations, the time element may be controlled with exactness.

If the oscillations of the float 10 arise from ripples on the surface of the datum, the circuit through the heater unit H is broken for very short intervals of time so that the bimetallic strip 21 is still provided with sufficient heat to keep it in its flexed position and may not relax to respond to the instantaneous variations of the float 10. The action of the flexible connection between the float 10, and the slide 26 and the time-delay mechanism will act to give a reading of the sustained level of the datum acting on the float 10 as shown by the indicating means I.

If, however, the change in the level of the datum is sustained for a length of time sufficient to break the circuit through the heater unit H for a period to allow a cooling sufficient to allow relaxation of the bimetallic strip 21 to release the nib 28a from the valley of the serrations 30, the bimetallic strip will be moved to the new position during its free period by the action of the resilient member 17 on the plug 20. The resilient members 17 act to create a balance of forces between themselves by pushing against the contact member 19 through the medium of the contact points 18 so as to obtain a neutral position. While the parts are in this neutral position, the circuit in the heater unit is again closed for a sufficient period of time to cause flexure of the bimetallic strip to cause the nib 28a to cooperate with a new valley between the serrations 30. In this way, the position of the contact member 26a will respond to sustained changes in position of the float 10 if the position of the float 10 is sustained for a period of time longer than the time-delay as determined by the relations pointed out above. The gauge will, therefore, not indicate momentary oscillations of the float 10 and yet respond to any sustained change in level of the datum.

In Figures 5, 6, and 7 there is shown another modification of this invention in which another form of flexible connection between the stub shaft 11a and the contact member 26a is disclosed. In this structure, spring members 50 are provided which are anchored to the Y-piece 16 by means of the plug 51. The plug 51 may be conveniently attached to the Y-piece 16 by riveting or the like. The spring members 50 cooperate with a right angle member 52 which is attached to the bimetallic strip 21a, the bimetallic strip being provided with a nib 28a and a contact point 53. The right angle member 52, the contact 53 and the nib 28a may be attached to the bimetallic strip 21a in any convenient manner as, for example, by riveting as shown in Figure 6.

The contact member 53 cooperates with a second contact member 54 which is riveted to a metal strip 55. The strip 55 is fixedly attached to the Y-piece 16 in any convenient manner as, for example, by riveting in such a manner that it bisects the notch in the Y-piece 16. The right angled member 52 cooperates with the spring members 50 by being positioned therebetween as is clearly shown in Figure 5. The interaction of the member 52 and the spring members 50 determine the neutral position between the Y-piece 16 and the bimetallic strip 21a. When the neutral position obtains, the contact points 53 and 54 cooperate to complete the circuit through the heater unit H as is clearly shown in Figure 7. If the Y-piece 16 is displaced from the neutral position at times when the bimetallic strip 21a is flexed, to place the nib 28a into a valley of the serrations 30, the circuit through the heater unit H will be broken by having the contact member 54 displaced from axial alignment with the contact member 53.

The contact area between the contact members 53 and 54 is made comparatively small by giving the contact point 54 a cone shape which will tend to give a better integrated value to the oscillations of the float 10. Figure 7 shows a schematic diagram of connections of the cooperating elements of the circuits in this modification. The operation of this modification is substantially similar to that shown in the other figures described in detail above.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation.

What is claimed:

1. In a device of the class described, a variable rheostatic device adapted to be connected in circuit with an indicating means, actuating means cooperating with a datum to be measured to adjust the rheostatic device in proportion to the position of the datum to be measured, holding means cooperating with the rheostatic device to maintain the rheostatic device in a position proportionate to sustained positions of the datum, a resilient connection between the rheostatic device and the actuating means to allow relative movement therebetween during temporary changes in the datum, and means to temporarily release the holding means after a predetermined time interval after a change of sustained position of the datum to allow the actuating means to adjust the rheostatic device to a position proportionate to the new sustained level of the datum.

2. In a device of the class described, a variable rheostatic device adapted to be connected in circuit with an indicating means, a float responsive to the level of the liquid to be indicated for actuating the variable rheostatic device, a resilient conection between the float and the variable rheostatic device, a bimetallic strip cooperating with the variable rheostatic device and adapted to hold the adjustment thereof at a predetermined position of flexure, an electric heater element for the bimetallic strip to cause flexure thereof, make and break means in circuit with the electric heater and actuated in accordance with a predetermined bias upon the resilient connection between the float and variable rheostatic device, and a source of electric energy to energize the circuit.

3. In a device of the class described, a rheostatic means in an electric circuit adapted to actuate an indicating means in proportion to a variable datum, holding means cooperating with the rheostatic means to hold the rheostatic means in predetermined positions proportionate to sustained positions of the datum to be measured, actuating means cooperating with the datum to be measured, a resilient connection between actuating means and the rheostatic means to allow movement therebetween during temporary changes of condition of the datum, and control means responsive through the actuating means to changes in the sustained condition of the datum to release the holding means temporarily to allow the actuating means to adjust the rheostatic means to a new position proportionate to the new sustained condition of the datum.

4. The device defined in claim 3 wherein the holding means is a thermal element with an electric heating element, a predetermined degree of flexure of which determines the holding relation of the rheostatic means, and the heating element being in electric circuit with a make and break device comprising the control means, in which the actuating means controls the make and break means in accordance with a predetermined bias upon the resilient connection.

5. In a device of the class described, an electric indicating means having a quick response, a rheostatic means with a variable slide in electric circuit with the indicating means, datum-controlled means resiliently connected with the variable slide of the rheostatic means, self-retractable thermal holding means cooperating with the variable slide to fix the position thereof when flexed to a predetermined degree to prevent change of position of the slide by the datum-controlled means, electric heater means for the holding means, make and break means for the heater means actuated by the datum-controlled means to control the flexure of the holding means and determine the active periods of the holding means, whereby the variable slide of the rheostatic means assumes a mean position of the quick changes of level which is proportional to the sustained level of the datum.

6. In a float-controlled rheostatic device, a variable resistance adapted to actuate an indicating means in an electric circuit, a float means controlling the variable resistance to cause the indicating means to read proportionate to a variable liquid level, resilient means acting between the float means and the variable resistance to resiliently hold a predetermined relative position, self-retractive holding means responsive to a predetermined temperature to hold the variable resistance in a position having a proportion to a sustained level of the liquid, stop means to limit the deviation between the float means and the variable resistance from the predetermined relative position, electric thermal means cooperating with the holding means to obtain the predetermined temperature for the holding action, and circuit breaker means to control the circuit through the thermal means actuated in accordance with a predetermined bias upon the resilient means to release the holding means and allow the float means to move the variable resistance to a new position having a proportion to a new sustained level of the liquid.

JOSEPH I. LINER.